(12) United States Patent
Wang et al.

(10) Patent No.: US 11,714,649 B2
(45) Date of Patent: Aug. 1, 2023

(54) RISC-V-BASED 3D INTERCONNECTED MULTI-CORE PROCESSOR ARCHITECTURE AND WORKING METHOD THEREOF

(71) Applicant: SHANDONG LINGNENG ELECTRONIC TECHNOLOGY CO., LTD., Shandong (CN)

(72) Inventors: Gang Wang, Jinan (CN); Jinzheng Mou, Jinan (CN); Yang An, Jinan (CN); Moujun Xie, Jinan (CN); Benyang Wu, Jinan (CN); Zesheng Zhang, Jinan (CN); Wenyong Hou, Jinan (CN); Yongwei Wang, Jinan (CN); Zixuan Qiu, Jinan (CN); Xintan Li, Jinan (CN)

(73) Assignee: SHANDONG LINGNENG ELECTRONIC TECHNOLOGY CO., LTD., Jinan (CN)

( * ) Notice: Subject to any disclaimer, the term of this patent is extended or adjusted under 35 U.S.C. 154(b) by 0 days.

(21) Appl. No.: 17/621,600

(22) PCT Filed: Dec. 1, 2021

(86) PCT No.: PCT/CN2021/134879
§ 371 (c)(1),
(2) Date: Dec. 21, 2021

(65) Prior Publication Data
US 2023/0168892 A1 Jun. 1, 2023

(30) Foreign Application Priority Data
Nov. 29, 2021 (CN) .......................... 202111435059.X

(51) Int. Cl.
*G06F 9/38* (2018.01)
*G06F 9/30* (2018.01)
*G06F 15/78* (2006.01)

(52) U.S. Cl.
CPC ........ *G06F 9/30145* (2013.01); *G06F 9/3017* (2013.01); *G06F 9/3802* (2013.01); *G06F 9/3857* (2013.01); *G06F 15/7889* (2013.01)

(58) Field of Classification Search
None
See application file for complete search history.

(56) References Cited

U.S. PATENT DOCUMENTS

| | | | | |
|---|---|---|---|---|
| 8,060,727 B2 * | 11/2011 | Blixt | ..................... | G06F 9/3867 712/34 |
| 8,719,519 B2 * | 5/2014 | Naethke | .............. | G06F 9/30109 711/4 |

(Continued)

FOREIGN PATENT DOCUMENTS

| | | |
|---|---|---|
| CN | 111176731 A | 5/2020 |
| CN | 111209247 A | 5/2020 |

(Continued)

OTHER PUBLICATIONS

Machine Translation of Korean Patent Application KR 20030060067 A, 2003. (Year: 2003).*

(Continued)

*Primary Examiner* — Steven G Snyder
(74) *Attorney, Agent, or Firm* — Oliff PLC

(57) ABSTRACT

An RISC-V-based 3D interconnected multi-core processor architecture and a working method thereof. The RISC-V-based 3D interconnected multi-core processor architecture includes a main control layer, a micro core array layer and an accelerator layer, wherein the main control layer includes a plurality of main cores which are RISC-V instruction set CPU cores, the micro core array layer includes a plurality of micro unit groups including a micro core, a data storage unit, an instruction storage unit and a linking controller, wherein the micro core is an RISC-V instruction set CPU core that executes partial functions of the main core; the accelerator (Continued)

layer is configured to optimize a running speed of space utilization for accelerators meeting specific requirements, wherein some main cores in the main control layer perform data interaction with the accelerator layer, the other main cores interact with the micro core array layer.

10 Claims, 1 Drawing Sheet

(56) References Cited

U.S. PATENT DOCUMENTS

| | | | | |
|---|---|---|---|---|
| 8,924,660 | B2* | 12/2014 | Naethke | G06F 15/7857 |
| | | | | 711/4 |
| 9,189,240 | B2* | 11/2015 | Naethke | G06F 12/0607 |
| 9,411,600 | B2* | 8/2016 | Anvin | G06F 9/3877 |
| 9,459,871 | B2* | 10/2016 | Lipshits | G06F 9/325 |
| 9,483,266 | B2* | 11/2016 | Loktyukhin | G06F 9/30181 |
| 9,501,132 | B2* | 11/2016 | Mishaeli | G06F 1/3287 |
| 9,588,765 | B2* | 3/2017 | Fletcher | G06F 9/30014 |
| 9,652,237 | B2* | 5/2017 | Gramunt | G06F 9/3857 |
| 9,672,036 | B2* | 6/2017 | Ould-Ahmed-Vall | |
| | | | | G06F 9/30101 |
| 9,715,388 | B2* | 7/2017 | Chung | G06F 9/3842 |
| 9,880,852 | B2* | 1/2018 | Tan | G06F 9/5044 |
| 9,886,277 | B2* | 2/2018 | Loktyukhin | G06F 9/3017 |
| 10,175,986 | B2* | 1/2019 | Gramunt | G06F 9/30098 |
| 10,223,187 | B2* | 3/2019 | Raj | G06F 9/30076 |
| 10,267,850 | B2* | 4/2019 | Mao | G01R 31/3177 |
| 10,296,347 | B2* | 5/2019 | Loktyukhin | G06F 9/3836 |
| 11,409,529 | B2* | 8/2022 | Lee | G06F 9/3802 |
| 2008/0320280 | A1* | 12/2008 | Blixt | G06F 9/3867 |
| | | | | 712/34 |
| 2013/0332707 | A1* | 12/2013 | Gueron | G06F 9/3001 |
| | | | | 712/222 |
| 2013/0339649 | A1* | 12/2013 | Hsu | G06F 9/30032 |
| | | | | 711/170 |
| 2014/0189312 | A1* | 7/2014 | Tan | G06F 8/65 |
| | | | | 712/214 |
| 2014/0189331 | A1* | 7/2014 | Lipshits | G06F 9/3844 |
| | | | | 712/241 |
| 2014/0208085 | A1* | 7/2014 | Chung | G06F 9/30072 |
| | | | | 712/241 |
| 2015/0160998 | A1* | 6/2015 | Anvin | G06F 12/0817 |
| | | | | 714/807 |
| 2015/0178078 | A1* | 6/2015 | Anvin | G06F 9/30101 |
| | | | | 712/208 |
| 2016/0041945 | A1* | 2/2016 | Mishaeli | G06F 9/30145 |
| | | | | 712/32 |
| 2016/0378692 | A1* | 12/2016 | Anvin | G06F 12/1045 |
| | | | | 711/145 |
| 2019/0158428 | A1* | 5/2019 | Gray | H04L 47/2483 |
| 2019/0196968 | A1* | 6/2019 | Beckmann | G06F 12/0811 |
| 2021/0279055 | A1* | 9/2021 | Saxena | G06F 9/30018 |
| 2021/0286755 | A1* | 9/2021 | Vorbach | G06F 9/345 |
| 2021/0365266 | A1 | 11/2021 | Lee et al. | |
| 2022/0342673 | A1* | 10/2022 | Wang | G06F 8/445 |

FOREIGN PATENT DOCUMENTS

| | | |
|---|---|---|
| CN | 111340185 A | 6/2020 |
| CN | 113312303 A | 8/2021 |
| WO | 2016/159765 A1 | 10/2016 |

OTHER PUBLICATIONS

'3D-MMC: A Modular 3D Multi-Core Architecture with Efficient Resource Pooling' by Zhang et al., copyright 2013, EDAA. (Year: 2013).*

'INTACT: A 96-Core Processor with 6 Chiplets 3D-Stacked on an Active Interposer with Distributed Interconnects and Integrated Power Management' by Vivit et al., IEEE Journal of Solid-State Circuits, 2021. (Year: 2021).*

Aug. 25, 2022 International Search Report issued in International Patent Application No. PCT/CN2021/134879.

Aug. 25, 2022 Written Opinion issued in International Patent Application No. PCT/CN2021/134879.

* cited by examiner

RISC-V-BASED 3D INTERCONNECTED MULTI-CORE PROCESSOR ARCHITECTURE AND WORKING METHOD THEREOF

TECHNICAL FIELD

The present invention belongs to the technical field of integrated circuit processor hierarchy design, and in particular relates to an RISC-V-based 3D interconnected multi-core processor architecture and a working method thereof.

BACKGROUND

The description in this section merely provides background information related to the present invention and does not necessarily constitute the prior art.

Over the years, with the improvement of chip design technology and the wide range of applications, RISC-V has shown more and more advantages such as full open source and simple architecture that the traditional ARM and X86 architectures do not have. As found by the inventors, RISC-V is now widely used in design industries such as AIoT that do not have too many performance requirements for CPUs, but the existing RISC-V still has great disadvantages in some traditional high-performance processor requirements.

SUMMARY

In order to solve the above problems, the present invention provides an RISC-V-based 3D interconnected multi-core processor architecture and a working method thereof. The solution, by designing a main control layer with a plurality of main cores which have a cooperative effect, can not only strengthen the connection between the main cores, but also control micro core arrays efficiently and simultaneously through the plurality of main cores, perform efficient data interaction with an accelerator layer, improve the processing efficiency of a processor and provide a new design idea for the application of an RISC-V instruction set to high-performance processors.

According to a first aspect of an embodiment of the present invention, the present invention provides an RISC-V-based 3D interconnected multi-core processor architecture, which includes a main control layer, a micro core array layer and an accelerator layer, wherein the main control layer includes a plurality of main cores, the main cores are RISC-V instruction set CPU cores based on a five-stage pipeline, and the main cores interact with the main cores and the external environment through independent buses;

the micro core array layer includes a plurality of micro unit groups, the micro unit includes a micro core, a data storage unit, an instruction storage unit and a linking controller, wherein the micro core is an RISC-V instruction set CPU core that executes partial functions of the main core;

the accelerator layer is configured to optimize a running speed and space utilization for accelerators meeting specific requirements, wherein some main cores in the main control layer perform data interaction with the accelerator layer, the other main cores interact with the micro core array layer, external simple instructions are directly operated in the main cores, and complex instructions are converted into simple instructions which are then processed by the micro cores.

Further, the main control layer is configured to transmit and dispatch external incoming instructions, process received simple instructions in the main cores, convert complex instructions into simple instructions capable of being recognized by the micro cores in the main cores, and sequentially transmit the simple instructions to the micro cores of the micro core array layer for processing.

Further, instructions in the micro core control layer interact with the micro cores in a one-way transmission mode; data interact with the micro cores in a two-way transmission mode; in reverse interaction, data are subjected to data arbitration with forward data and then enter the micro cores.

Further, the linking controller in the micro core control layer is configured to compress a 3D structure in the micro core control layer into a 2D structure, at the same time, a fast channel is configured in the linking controller, and data are written back to the main control layer through the fast channel at the end of an operation.

Further, a specific linking mode of the linking controller is to perform data interaction on arrays under the control of other main cores; except for interaction between adjacent micro units, a micro unit group under a same main core does not perform data linking with other micro units in the same group.

According to a second aspect of an embodiment of the present invention, the present invention provides a working method of an RISC-V-based 3D interconnected multi-core processor architecture, the above RISC-V-based 3D interconnected multi-core processor architecture is used, and the method includes: receiving, by the main control layer, external data and instructions, and realizing fast processing of external instructions in combination with cooperative processing of the micro core array layer and the accelerator layer.

Compared with the prior art, the present invention has the following beneficial effects:

(1) The present invention provides an RISC-V-based 3D interconnected multi-core processor architecture. The solution, by designing a main control layer with a plurality of main cores which have a cooperative effect, can not only strengthen the connection between the main cores, but also control micro core arrays efficiently and simultaneously through the plurality of main cores, perform efficient data interaction with the accelerator layer, and provide a new design idea for the application of an RISC-V instruction set to high-performance processors.

(2) The present invention, by designing a micro core array layer with a 3DRouter, makes each capable of performing interaction of at most additional two groups of data on the basis of the traditional multi-core architecture. The 3DRouter not only provides a forward data path, but also provides a reverse fast channel. Data return to the main core control array through the fast channel only after the micro cores complete the instructions, the speed of writing back the data is greatly improved, and the design idea of wide and fast micro core arrays is fulfilled.

(3) In the present invention, the accelerators are connected with all micro core arrays on the most unilateral side, so that accelerator training results can be transmitted to the micro core arrays without passing through the main cores. At the same time, the accelerator layer also performs data interaction with the main cores, and the main cores process the data received from the outside and transmit the processed data to the accelerator layer for training.

(4) The micro cores in the micro core array layer of the present invention adopt a one-stage pipeline, and the micro cores of the one-stage pipeline can complete a single instruction at the fastest speed and improve the performance of the micro core arrays to the greatest extent.

The advantages of additional aspects of the present invention will be given in part in the following description, and some will become obvious from the following description, or will be known through the practice of the present invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

Figure 1:
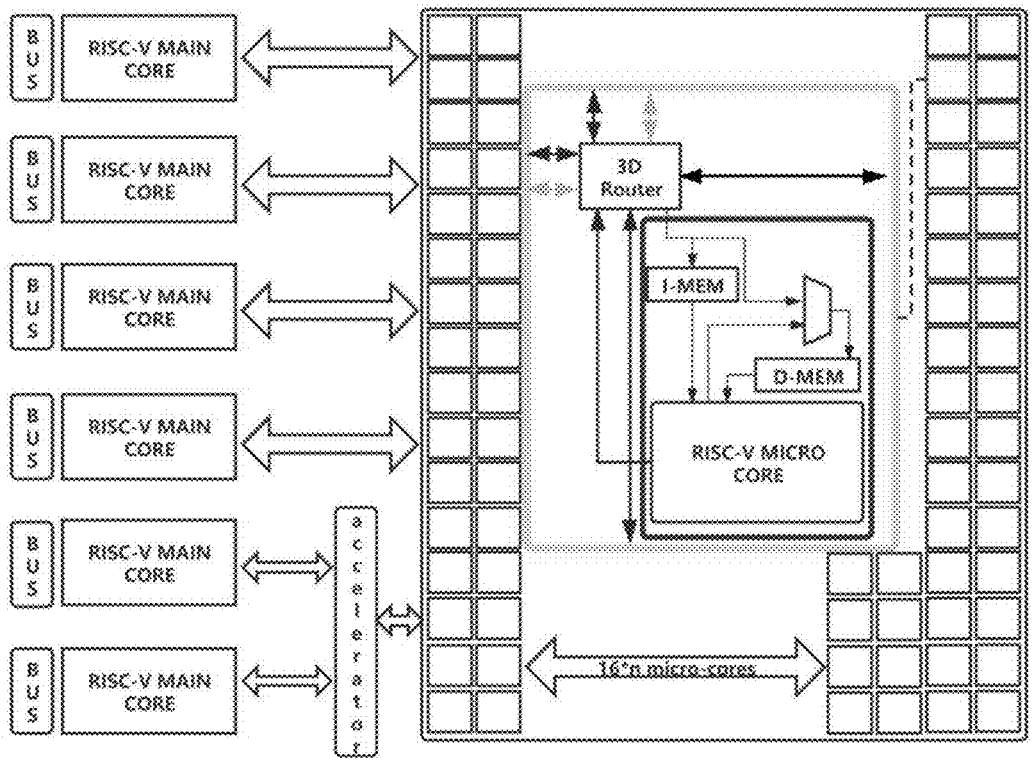
FIG. 1 is a schematic diagram of an RISC-V-based 3D interconnected multi-core processor architecture in embodiment 1 of the present invention.

The present invention is further described below with reference to the accompanying drawings and embodiments.

It should be noted that, the following detailed descriptions are all exemplary, and are intended to provide further descriptions of the present disclosure. Unless otherwise specified, all technical and scientific terms used herein have the same meanings as those usually understood by a person of ordinary skill in the art to which the present disclosure belongs.

It should be noted that the terms used herein are merely used for describing specific implementations, and are not intended to limit exemplary implementations of the present disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

The embodiments in the present prevention and features in the embodiments may be combined with each other in the case of no conflict.

Embodiment 1

The purpose of this embodiment is to provide an RISC-V-based 3D interconnected multi-core processor architecture.

An RISC-V-based 3D interconnected multi-core processor architecture includes a main control layer, a micro core array layer and an accelerator layer, wherein the main control layer includes a plurality of main cores, the main cores are RISC-V instruction set CPU cores based on a five-stage pipeline, and the main cores interact with the main cores and the external environment through independent buses;

the micro core array layer includes a plurality of micro unit groups, the micro unit includes a micro core, a data storage unit, an instruction storage unit and a linking controller, wherein the micro core is an RISC-V instruction set CPU core that executes partial functions of the main core;

the accelerator layer is configured to optimize a running speed and space utilization for accelerators meeting specific requirements, wherein some main cores in the main control layer perform data interaction with the accelerator layer, the other main cores interact with the micro core array layer, external simple instructions are directly operated in the main cores, and complex instructions are converted into simple instructions which are then processed by the micro cores.

Further, the main control layer is configured to transmit and dispatch external incoming instructions, process received simple instructions in the main cores, convert complex instructions into simple instructions capable of being recognized by the micro cores in the main cores, and sequentially transmit the simple instructions to the micro cores of the micro core array layer for processing.

Further, the main control layer includes six main cores, two of the main cores interact with the accelerator layer and the other four main cores interact with the micro core array layer.

Further, instructions in the micro core control layer interact with the micro cores in a one-way transmission mode; data interact with the micro cores in a two-way transmission mode; in reverse interaction, data are subjected to data arbitration with forward data and then enter the micro cores.

Further, the linking controller in the micro core control layer is configured to compress a 3D structure in the micro core control layer into a 2D structure, at the same time, a fast channel is configured in the linking controller, and data are written back to the main control layer through the fast channel at the end of an operation.

Further, a specific linking mode of the linking controller is to perform data interaction on arrays under the control of other main cores; except for interaction between adjacent micro units, a micro unit group under a same main core does not perform data linking with other micro units in the same group.

Further, the micro core control layer includes sixteen rows of micro unit groups, and each main core interacting with the micro core array layer in the main cores controls and performs data interaction with four rows of micro unit groups respectively.

Further, the accelerator layer is configured to adopt different accelerators according to different requirements for data type, network compression and tensor calculation performance to achieve the optimal running speed of space utilization.

Further, the five-stage pipeline specifically includes instruction fetching, decoding, memory access, execution and writing back.

Specifically, for the convenience of understanding, the solution of the present disclosure will be described in detail below with reference to the accompanying drawings.

Referring to FIG. 1, an RISC-V-based 3D interconnected multi-core processor architecture consists of three layers of architectures, which are respectively a main control layer, a micro core array layer and an accelerator layer.

Further, the main control layer consists of:

six five-stage pipeline RISC-V instruction set CPU cores (hereafter referred to as main cores, the structure of which will be described subsequently) capable of completely executing instruction fetching, decoding, memory access, execution and writing back. Each core interacts with the external environment through an independent bus.

At the same time, the main cores can perform data or instruction interaction therebetween through buses for data and instruction interaction with the external environment.

Two of the main cores perform data interaction with the accelerator layer, the other four main cores interact with the micro core array layer, each main core controls and perform data interaction with four rows of micro core groups, and the four main cores control 16 rows of micro core groups in total.

The main functions to be achieved by the main control layer are to transmit and dispatch external incoming instructions, when receiving simple instructions, operate directly in the main cores, and after receiving some complex operation instructions or a series of instructions, convert the instructions into a group of simple instructions capable of being recognized by the micro cores, and sequentially transmit the simple instructions to the micro core array layer.

Further, the micro core array layer consists of:

16*n micro units consisting of RISC-V instruction set CPUs (hereafter referred to as micro cores) capable of executing partial functions of the main cores, a data storage unit, an instruction storage unit and a 3DRouter.

In this micro unit, instructions interact with the micro cores in a one-way transmission mode; data interact with the micro cores in a two-way transmission mode; in reverse interaction, data are subjected to simple data arbitration with forward data and then enter the micro cores.

3DRouter is a linking controller that compresses a 3D structure into a 2D structure at the micro core array layer. This linking controller enables each micro unit to perform data interaction with at most six other micro units at the same time. Meanwhile, in order to facilitate data writing back, a special fast channel is configured in the 3DRouter. At the end of an operation, data are written back to the main control layer through the fast channel of the 3DRouter. Furthermore, the 3DRouter is a novel connection controller different from other traditional multi-core connection modes, which makes each micro core have at most two more additional connection modes than the traditional multi-core connection mode. Meanwhile, the 3DRouter also provides a data path to return to the main core quickly.

A linking mode of the 3DRouter is as follows:

Since every four rows of micro units are controlled by one main core, in order to avoid data conflict, a micro unit array under a same main core does not perform data linking with other micro units of the same array except the interaction between adjacent micro units. The linking mode is to perform data interaction with the arrays under the control of other main cores. Description is made by taking a [16*3] micro unit matrix as an example. The micro unit at a position [1,1] is adjacent to the micro units at positions [1,2] and [2,1] in the physical and data sense. Meanwhile, the micro unit at the position [1,1] is adjacent to micro unit arrays controlled by other main cores in the data sense. The method adopted is that [1,1] and [5,2] are adjacent in the data sense, that is, each micro unit is adjacent to a micro unit at a vertical position thereof plus four and a horizontal position thereof plus one in the data sense. Similarly, the micro unit at a position [5,2] is adjacent to micro units at positions [4,2], [6,2], [5,1] and [5,3] in the physical and data sense, and is adjacent to micro units at positions [9,3] and [1,1] in the data sense. A micro unit linked by using the 3DRouter can perform data interaction with at most six surrounding micro units at the same time, thus greatly improving the running speed of a group of data.

In the RISC-V micro core, the functions of instruction fetching, decoding and memory access are weakened, the five modules are integrated into a one-stage pipeline, and function execution is strengthened to mainly strengthen the operation performance.

Further, in the accelerator layer,

AI accelerators are mainly used. Specifically, the accelerator layer can generally adopt FPGA or ASIC for neural network training for acceleration training. According to different requirements for data type, network compression and tensor calculation performance, different accelerators are adopted to optimize the running speed and space utilization.

In the linking between the accelerator layer and the micro core array layer, the accelerators and the 16 rows of micro unit arrays are interconnected, and each micro unit has a special corresponding accelerator interface.

Further, the structure of the main core is specifically as follows:

The main core adopts a design structure of a five-stage pipeline. The five-stage pipeline structure includes instruction fetching, decoding, memory access, execution and writing back.

In the instruction fetching process of the main core, after external instructions are transmitted to the instruction storage unit, the instructions are read out from a memory, and branch prediction and jumping are also performed.

In the decoding process of the main core, the instructions fetched out from the memory are "translated" according to an instruction set format, an operand register index required by the instruction is obtained after translation, and an operand is fetched out from a general-purpose register group according to the index.

In the execution of the main core, after obtaining the operand through translation during decoding, a command is executed according to an operation type. An arithmetic logic unit (ALU) in the main core is only required to perform simple logic operation. The execution process of the main core is simplified as much as possible, and the logic operation in the ALU maintains a single cycle, which can greatly reduce the area of the main core and shorten the operation of the main core.

In the memory access process of the main core, a memory access instruction is read out from or written into the memory.

In the writing-back process of the main core, the execution result is written back to the general-purpose register group according to the memory access instruction.

Further, the structure of the micro core is specifically as follows:

In the structure of the micro core, in order to minimize the operation cycle, a single pipeline structure is adopted to complete all the functions of a CPU in one pipeline stage. This structure can most closely connect all cores in multi-core cooperative work, and can greatly improve the operation speed.

Although the micro core is a one-stage pipeline, it can still fully perform all the functions of a single processor. Firstly, the micro core stores the instruction received from the main core or other micro cores in its own instruction memory, and then dispatches and transmits the instruction to an execution module through instruction fetching and decoding.

In the execution module of the micro core, a shaping high-performance multiplier combined with high-performance Booth and Wallace algorithms is used to complete each multiplication operation as quickly as possible. In order to avoid data conflict, each micro core only performs the operation of one instruction at the same time. After the operation and analysis of the instruction and data, the data are written back after applying for memory access.

In the writing-back process, there are two data flow directions. One is that the data flow into the data memory in the current core, are arbitrated with the original data and flow back into the micro core again. The other is that the data are written back to the 3DRouter. After writing back to the 3DRouter, the current core can accept new data again through a handshake signal. It is worth noting that the current core may perform data interaction with at most six other micro cores, so each core has at most six groups of handshake signals.

So far, the work of the individual micro core has been completed. The data will be temporarily stored in the 3DRouter, and then transmitted by the 3DRouter to other micro cores. Meanwhile, in order to facilitate the data to be written back to the main core, a special fast channel is configured in the 3DRouter. The fast channel of the 3DRouter will be used only when the data need to be written back at high speed after the operation is completed.

Embodiment 2

The purpose of this embodiment is to provide a working method of an RISC-V-based 3D interconnected multi-core processor architecture, the above RISC-V-based 3D interconnected multi-core processor architecture is used, and the method includes: receiving, by the main control layer, external data and instructions, and realizing fast processing of external instructions in combination with cooperative processing of the micro core array layer and the accelerator layer.

Specifically, for the convenience of understanding, the solution of the present disclosure will be described in detail below with reference to the accompanying drawings.

Example 1

Description of the operation method will be made by taking the multiplication of two [3*3] matrices a and b to obtain matrix c as an example.

Matrix A is obtained by accelerator training. Matrix b is obtained by bus transmission to the main core. The multiplication of the two matrices totally involves 18 additions and 27 multiplications.

Since the RISC-V instruction set does not support tensor and vector instruction set expansion at present, in the implementation mode, only tensor vector instructions that may appear in the future are used for simulation.

Figure 2:
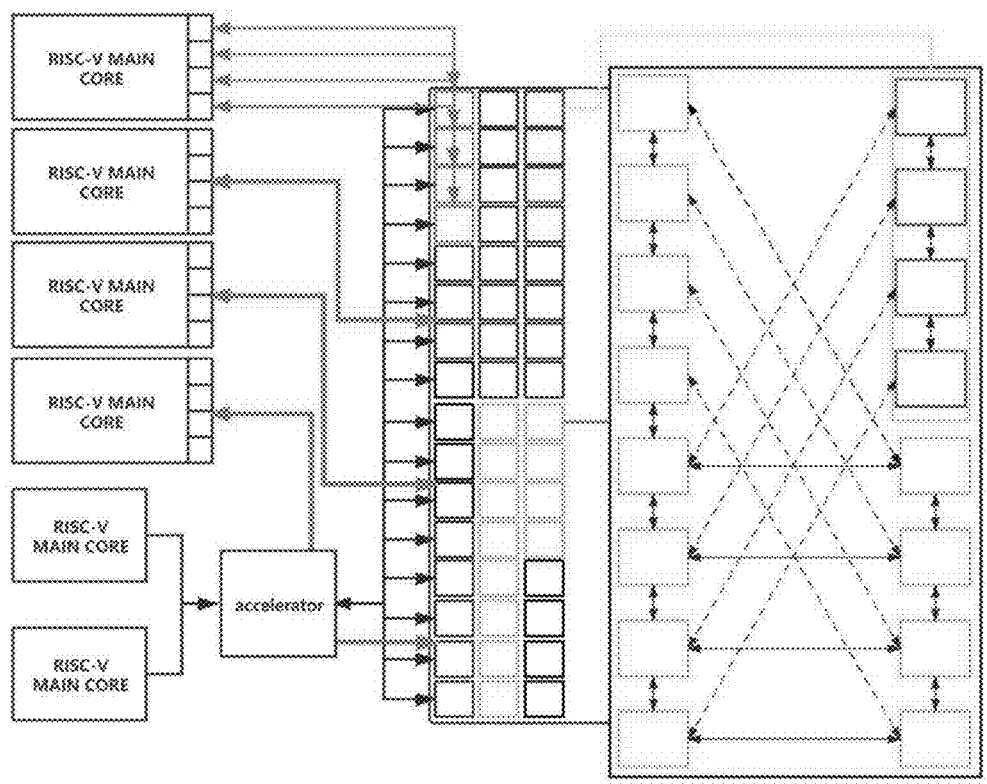
FIG. 2 is a schematic diagram of connection interaction and data flow direction of the RISC-V-based 3D interconnected multi-core processor architecture in embodiment 1 of the present invention.

In the tensor RISC-V instruction set operation mode that supports the multiplication of the whole matrix by simulation (when only a scalar instruction set is used for operation, the following steps may be executed step by step as separate instructions), for the convenience of description, the main cores are labeled from top to bottom, which are respectively [1-6]. Specifically, referring to FIG. 2, a working method of an RISC-V-based 3D interconnected multi-core processor architecture is specifically as follows:

1. Firstly, external data are transmitted to a main core [6] through a bus, then the main core {6} arranges and transmits the data to an accelerator for training, and then the accelerator transmits matrix a obtained after training (9 integer data in total) to a main core [5] sequentially (in terms of architecture design, it also supports direct transmission from the accelerator to the micro core array, but in order to show the cooperative effect of the main control layer and store matrix b, the data flow mode from the main core [6] to the accelerator to the main core [5] is adopted).

2. While the training process is performed, the matrix b is externally divided into three groups of vertical 3D vectors which are sequentially transmitted to main cores [1-3] (they may also be arbitrarily allocated to main cores [1-4] in other ways. This data allocation method is adopted here to show the cooperative operation between the main cores). After obtaining the matrix a in the main core [5], the matrix is divided into horizontal 3D vectors which are stored in the main core [5].

3. Matrix a and matrix b in the main core [5] are multiplied, and a total of 9 inner product operations are performed. Each inner product operation is disassembled into three multiplication operations and two addition operations. Now it is assumed that the micro core array layer is a 16*8 micro core matrix. First, the main core [5] transmits the first horizontal vector of b to the main cores [1-3] sequentially through the bus (when there are great requirements for operation resources or power consumption, a way of transmitting data only to the first main core may be adopted. In this way, after each inner product operation, all data will be shifted to the right, and b transmits the data to the array controlled by the next main core through the 3DRouter, that is, the data flow direction of a dotted line in FIG. 2). Main cores [1-3] divide the multiplication instruction and two groups of 3D vectors into separate integer data and sequentially transmit them to the corresponding controlled micro core arrays. At this time, nine micro cores receive the multiplication instruction to perform multiplication operation.

4. After the first micro core multiplication operation, the obtained data are transmitted to the micro core on the right, the data are added down vertically, and the final addition result is stored in the following micro core that does not accept the instruction. Description will be made by taking the micro core array controlled by the main core [1] as an example. Micro units at positions [1,1], [2,1] and [3,1] of the micro core array calculate a[1,1]*b[1,1], a[1,2]*b[2,1], and a[1,3]*b[3,1], the results of the operations are sequentially shifted rightwards to micro units at positions [1,2], [2,2] and [3,2], then the data of the micro unit [1,2] are transmitted down and added to the data of the micro unit [2,2], and then the result of the operation is shifted down and added to the data of the micro unit [3,2] to obtain the final result, that is, c[1,1] is placed on the memory of a micro unit [4,2].

5. After the above process is completed, a second group of inner products are calculated. The main core [5] sequentially transmits b[2,1], b[2,2] and b[2,3] to micro core arrays controlled by the main cores [1-3], performs the same multiplication operation as step 4, and then performs the overall rightward shifting. Still taking the micro core arrays controlled by the core [1] as an example, after the operation is completed, data stored in micro units at positions [1,2], [2,2] and [3,2] are sequentially subjected to a[1,1]*b[1,2], a[1,2]*b[2,2], and a[1,3]*b[3,2]. Similarly, the data are shifted down and added to the memory of a micro unit at [4,2] to obtain c[1,2]. It is worth noting that due to the overall shifting of the previous data, the integer data of c[1,1] have been stored in the memory of the micro unit at position [4,3] (at this time, the c data are stored in the data memory and are not in the core; since there is no transmission instruction, when the array scale is small, that is, n is small, the data of the micro unit [4,2] can also be written into the micro unit [4,3], then the two data are written into the memory in the core, and when the memory in the core reaches the upper limit, the data are labeled and transmitted to an adjacent micro unit through the 3DRouter).

6. Then the last group of vectors of b are transmitted to the micro core array and the above process is repeated. Similarly, when the array scale is small and shifting rightward cannot be realized, the rightmost data will disappear, the new multiplication data will be written to the micro core in the rightmost column, and the data of matrix c will be stored.

7. In the process of performing steps 1-6 above, the main core [2] and the main core [3] also perform the same process. Multiplication operation is performed on the second row vector of a and the matrix b, multiplication operation is performed on the third row vector of a and the matrix b, and the results of the operations, as above, are labeled and written into a certain micro core of the micro core array.

8. Finally, each micro core unit that obtains the data in the matrix c returns the data to the interior of the main core controlling the corresponding array through the fast channel of the 3DRouter, then the data are transmitted to the main core [4] through the bus, and the complete matrix c is obtained through arrangement in the main core [4].

Example 2

Now description will be made by taking two [32*32] large matrices as an example.

According to the partitioned matrix multiplication formula:

$$\begin{pmatrix} A & B \\ C & D \end{pmatrix} * \begin{pmatrix} X & Y \\ Z & W \end{pmatrix} = \begin{pmatrix} A*X+B*Z & A*Y+B*W \\ C*X+D*Z & C*Y+D*W \end{pmatrix},$$

the 32*32 large matrix may be divided into four [16*16] matrices. Due to the scale limitation of the micro core array, all square matrices larger than [16*16] should be divided into several small square matrices by the above method. Unlike the previous example, [16*16] square matrices will occupy the whole array resources, so the first matrix a is divided into 16 horizontal vectors, then each 16-dimensional vector is divided into four 4-dimensional vectors which are sequentially stored in the main cores [1-4], and the four main cores transmit the first row data and multiplication instructions to the micro cores at the same time.

At this time, for the matrix b obtained through accelerator training, the first column data are directly transmitted to the micro core array (here the way of transmitting data to a main core and then transmitting the data to other main cores through buses in the previous example is not used, since the data scale is relatively large, and in order to show another operation mode of direct interaction between the accelerator and the micro core array). At this time, the micro core array calculates to obtain the data of c[1,1].

According to the multiplication of this kind of vector and the subsequent operation process in example 1, matrix c can be obtained.

On the whole, when the two [32*32] matrices are multiplied, totally 8 matrix multiplications and 4 matrix additions are performed. It is worth noting that each of data returned through the 3DRouter must be stored in a main core. In order to avoid data conflict, when the received data are transmitted in a main core, the data are transmitted to a main core [6] without storing a matrix as much as possible. The scale of matrix addition operation is much smaller than that of matrix multiplication. The operation can be performed through the micro core array or the addition operation is directly performed in the main core to output the result, which will not be repetitively described here.

A person of ordinary skill in the art may notice that the exemplary units and algorithm steps described with reference to this embodiment can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

The RISC-V-based 3D interconnected multi-core processor architecture and the working method thereof provided by the above embodiments can be implemented and have broad application prospects.

The foregoing descriptions are merely preferred embodiments of the present invention, but are not intended to limit the present invention. A person skilled in the art may make various alterations and variations to the present invention. Any modification, equivalent replacement, or improvement made and the like within the spirit and principle of the present invention shall fall within the protection scope of the present invention.

What is claimed is:

1. A Reduced Instruction Set Computer Five-based three dimensional (RISC-V-based 3D) interconnected multi-core processor architecture, comprising a main control layer, a micro core array layer and an accelerator layer, wherein
the main control layer comprises a plurality of main cores, the main cores are RISC-V instruction set Central Processing Unit (CPU) cores based on a five-stage pipeline, and the main cores interact with other main cores and the external environment through independent buses;
the micro core array layer comprises a plurality of micro unit groups, a micro unit comprises a micro core, a data storage unit, an instruction storage unit and a linking controller, wherein the micro core is an RISC-V instruction set CPU core that executes partial functions of the main core;
the accelerator layer is configured to optimize a running speed and space utilization for accelerators meeting specific requirements, wherein
some main cores in the main control layer perform data interaction with the accelerator layer, the other main cores interact with the micro core array layer, external simple instructions are directly processed in the main cores, and complex instructions are converted into simple instructions which are then processed by the micro cores.

2. The RISC-V-based 3D interconnected multi-core processor architecture according to claim 1, wherein the main control layer is configured to transmit and dispatch external incoming instructions, process received simple instructions in the main cores, convert complex instructions into simple instructions capable of being recognized by the micro cores in the main cores, and sequentially transmit the simple instructions to the micro cores of the micro core array layer for processing.

3. The RISC-V-based 3D interconnected multi-core processor architecture according to claim 1, wherein the main control layer comprises six main cores, two of the main cores perform data interaction with the accelerator layer and the other four main cores interact with the micro core array layer.

4. The RISC-V-based 3D interconnected multi-core processor architecture according to claim 1, wherein instructions in the micro core array layer interact with the micro cores in a one-way transmission mode; data interact with the micro cores in a two-way transmission mode; in reverse interaction, data are subjected to data arbitration with forward data and then enter the micro cores.

5. The RISC-V-based 3D interconnected multi-core processor architecture according to claim 1, wherein the linking controller in the micro core array layer is configured to compress a 3D structure in the micro core array layer into a two dimensional (2D) structure, at the same time, a fast channel is configured in the linking controller, and data are written back to the main control layer through the fast channel at the end of an operation.

6. The RISC-V-based 3D interconnected multi-core processor architecture according to claim 1, wherein a specific linking mode of the linking controller is to perform data interaction on arrays under the control of other main cores; except for interaction between adjacent micro units, a micro unit group under a same main core does not perform data linking with other micro units in the same group.

7. The RISC-V-based 3D interconnected multi-core processor architecture according to claim 1, wherein the micro core array layer comprises sixteen rows of micro unit groups, and each main core interacting with the micro core array layer to control and perform data interaction with four rows of micro unit groups respectively.

8. The RISC-V-based 3D interconnected multi-core processor architecture according to claim 1, wherein the accelerator layer is configured to adopt different accelerators according to different requirements for data type, network compression and tensor calculation performance to achieve the optimal running speed eand space utilization.

9. The RISC-V-based 3D interconnected multi-core processor architecture according to claim 1, wherein the five-stage pipeline specifically comprises instruction fetching, decoding, memory access, execution and writing back.

10. A working method of the RISC-V-based 3D interconnected multi-core processor architecture of claim 1, the method comprising:
receiving, by the main control layer, external data and instructions, and
realizing fast processing of external instructions in combination with cooperative processing of the micro core array layer and the accelerator layer.

* * * * *